United States Patent
Tricoles

[11] 3,757,332
[45] Sept. 4, 1973

[54] HOLOGRAPHIC SYSTEM FORMING IMAGES IN REAL TIME BY USE OF NON-COHERENT VISIBLE LIGHT RECONSTRUCTION

[75] Inventor: Gus P. Tricoles, San Diego, Calif.

[73] Assignee: General Dynamics Corporation, St. Louis, Mo.

[22] Filed: Dec. 28, 1971

[21] Appl. No.: 213,130

[52] U.S. Cl. .................................. 343/17, 350/3.5
[51] Int. Cl. .............................................. G01s 7/04
[58] Field of Search ....................... 343/17; 350/3.5

[56] References Cited
UNITED STATES PATENTS
3,691,517  9/1972  Riggs ........................... 340/15.5 CP
3,558,207  1/1971  Worthington, Jr. .................. 350/3.5
3,514,177  5/1970  Lohman .............................. 350/3.5
3,284,799  11/1966  Ross ................................. 343/17 X OTHER PUBLICATIONS
G. W. Stroke et al. "Holography With Spatially Noncoherent Light," Appl. Physics Letter, Vol. 7, No. 9, pp. 229–231.

Primary Examiner—Benjamin A. Borchelt
Assistant Examiner—G. E. Montone
Attorney—Martin LuKacher

[57] ABSTRACT

A holographic system is described for forming visible images in real time using holograms sensed with microwave or acoustic waves. Coherent waves are received together with a coherent reference wave at a set of detectors in an antenna array to develop an interference fringe pattern. A visible luminous display of the fringes is produced on a reduced scale by light bulbs driven by the detectors; the light bulbs producing monochromatic, spatially non-coherent visible light. The light from the bulbs is passed through a beam splitter with a portion going through an inverting prism so as to produce an axially symmetric pair of the fringe patterns. A lens delivers the Fourier transform of the double fringes in its focal plane so as to produce a transform which provides the image.

22 Claims, 1 Drawing Figure

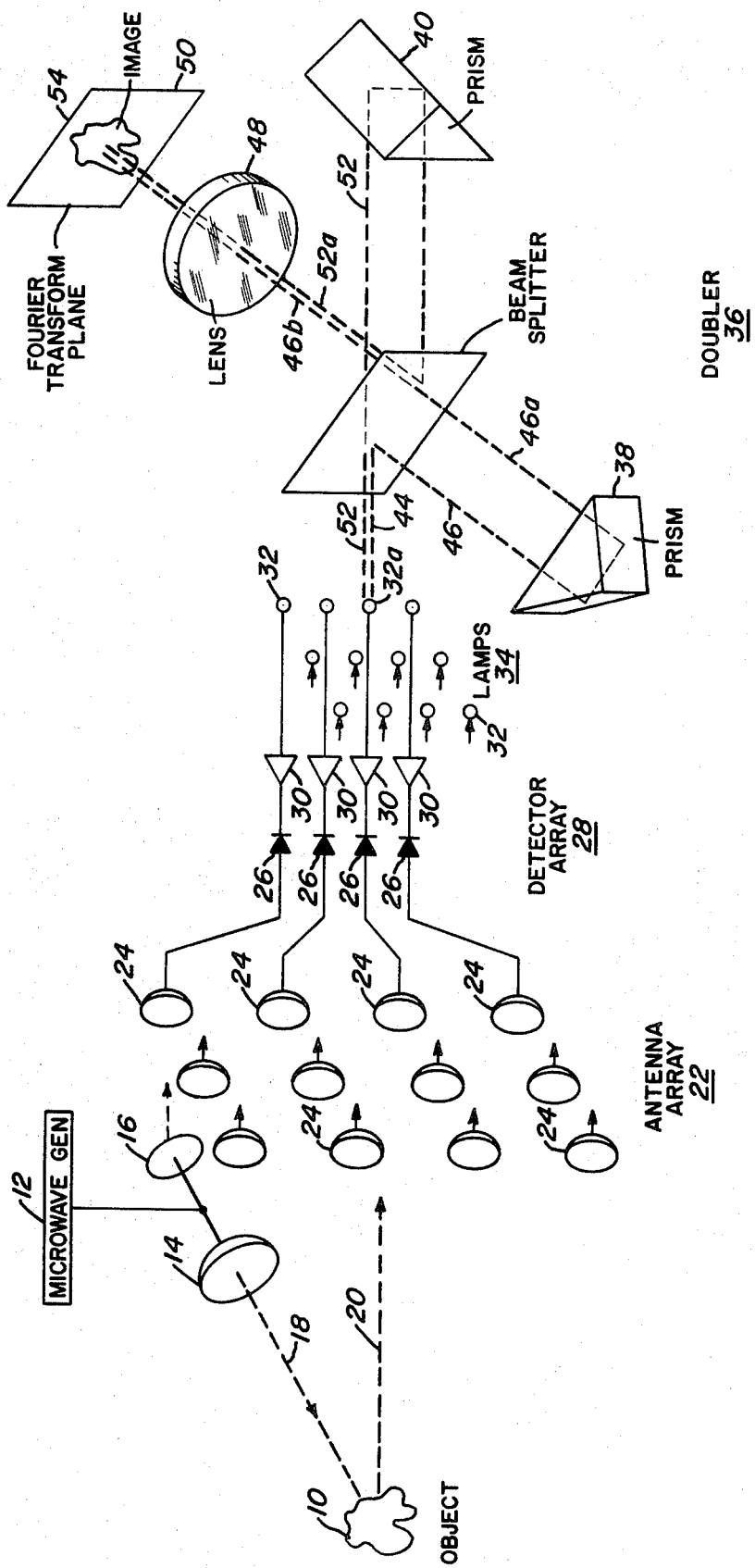

HOLOGRAPHIC SYSTEM FORMING IMAGES IN REAL TIME BY USE OF NON-COHERENT VISIBLE LIGHT RECONSTRUCTION

The present invention relates to holography and particularly to the reconstruction of holograms of objects in optically opaque surroundings.

The invention is especially suitable for use in long wavelength holography where holograms are made with microwaves or sonic waves and eliminates the time delay that occurs in the preparation of optical holograms from microwave or sonic wave data.

Conventional long wavelength holography is not performed in real time. Rather an optical hologram is prepared from the long wavelength data and a visible image is reconstructed from the optical hologram conventionally using coherent (e.g., laser) light for the reconstruction. (see for example U.S. Pat. Nos. 3,400,363; 3,518,367 and 3,450,225).

Techniques have been suggested for holography of non-coherently illuminated objects by illuminating an optical hologram made with non-coherent light with non-coherent light used for reconstruction. (see U.S. Pat. No. 3,514,177). Such systems are not suitable in long wavelength holography where the illuminating source is usually coherent (for example, microwaves); moreover, an optical hologram is also required thus militating against real time holography.

It is an object of the present invention to provide an improved system for and method of holography whereby holography can be performed in real time without the need for an intermediate process as may involve the making of an optically transparent hologram.

It is a further object of the invention to provide an improved method of and system for holography where the hologram is made with coherent waves and reconstructed through the use of non-coherent illumination.

Briefly described, a holographic system embodying the invention utilizes an array of independent antennas to detect the interference fringes of an object illuminated by coherent waves; the antennas being located in the hologram plane. The power received by each antenna is translated into the brightness of individual sources of spatially non-coherent visible light. The light from the sources is then transformed into an image as by doubling the pattern of illumination from the sources to produce two axially symmetric holograms which interfere with each other in the focal plane of a lens to reconstruct the image of the object. The invention is also applicable to the reconstruction of holograms that are made with explicitly measured phase data, e.g., detour phase holograms.

The invention itself, both as to its organization and method of operation, as well as additional objects and advantages thereof will become more readily apparent from a reading of the following description taken with the accompanying drawings, the sole figure of which is a schematic view of a holographic system in accordance with a preferred embodiment of the invention.

Referring to the drawing the system includes apparatus for forming a microwave hologram of an object 10. A microwave generator 12, feeds an illuminating antenna 14, and a reference antenna 16. These antennas produce coherent microwave radiation which is projected along illustrative ray path 18, to the object whence it is reflected therefrom along illustrative ray path 20, to a hologram plane 22. The reference antenna 16, also illuminates the hologram plane with coherent radiation. An array of antennas 24 is located at the hologram plane. In order to simplify the illustration, only four of the antennas which are located along the vertical line at one edge of the plane, and two additional antennas located at the opposite corners of the plane 22, are shown. The antenna array may have nine or more antennas, which may be equally spaced from each other in the hologram plane. The array size determines the resolution of the resulting hologram since it samples the fringes produced by the interference of the reference illumination and the object illuminating illumination. The antennas in the array effectively sample this interference pattern in the hologram plane, 22. For making high quality images the array may be enlarged and have many closely spaced antennas. To a good approximation, a rectangular array may have resolution equal to $R\lambda D$, where $\lambda$ is wavelength, $D$ is the desired hologram, and thus, array size, and $R$ is the distance between the object and the hologram plane 22.

In the hologram plane, microwave fringes are formed from the highly coherent microwave fields established by the antennas 14 and 16. These fringes have maxima and minima of microwave intensity which are received at the antennas 24. The antennas are connected to a corresponding plurality of diodes 26, in an array of diodes 28. Only the diodes which are located along a vertical edge of the diode array 28, are shown to simplify the illustration. The signals detected by the diodes 26, are amplified in amplifiers 30, and used to drive light sources, 32, in an array of light sources 34. This array is located in the same plane. The light sources are preferably monochromatic, incandescent lamps or light emitting diodes which produce visible light which is spatially non-coherent. The lamps are all located in the same plane. It will be noted that the size of the array of light sources 34, is smaller than the size of the antenna array. Thus, the visible luminous display of the microwave fringes in the hologram plane 22, is produced on a reduced scale by the array 34, thus enhancing the resolution of the hologram image to be formed by the system. It will be noted that there is a unique, one-to-one, simultaneous correspondence between the light sources 32 in and the array 34, and the antennas 24, in the antenna array. The array, 34, of light sources, therefore, produces a brightness distribution which represents the microwave fringe pattern in the microwave hologram formed in the hologram plane 22.

The luminous display produced by the lamp array 34, is transformed into a visible image of the object. To this end, light from each lamp 32, is processed in a doubler 36, which doubles the hologram produced by the lamps 32. The doubler consists of two prisms, 38 and 40, and a beam splitter 42. The doubler produces two axially, symmetric, visible displays of the microwave fringe pattern represented by the brightness of the display produced by the lamps 32. In effect the doubler produces two holograms. One is the original and the other is rotated 180° in the plane of the hologram. Thus, interference occurs between light from the same lamp which traverses the two paths in the doubler. Interference does not occur between light from any two different lamps in the array 34, because the illumination produced by the lamps is spatially non-coherent. Nevertheless, because of the doubling process, each source can interfere with itself to produce a set of fringes. The image is synthesized from the set of fringes as determined by the configuration of the hologram. Two illustrative ray paths are shown in the drawing. The path from one of the lamps 32a extends along a line 44 to the beam splitter, whence it is reflected along a path 46, which path is reversed in the prism 48 and passes through the beam splitter 42. After passing through the beam splitter 42, the path continues along line 46b through a converging lens 48, which produces a Fourier transform at a Fourier transform plane 50. The light from the same lamp 42a traverses another illustrative ray path 52 which extends through the beam splitter 42 to the prism 40 where it is inverted and reflected at the beam splitter along the path 52a which extends through the lens 48, to interfere with the light from the same source 32a, so as to produce the image of the object at the Fourier transform plane.

The lens 48 performs a Fourier transform of the hologram produced by array 34 of spatially non-coherent sources. This transform is an inverse transform, and, as a consequence of this inverse transform, the hologram diffracted field is an image of the object 10. This image 54 is produced in the Fourier transform plane of the lens, which plane is the focal plane of the lens 48.

Spatially non-coherent reconstruction in accordance with the invention may be better understood by considering a simplified case consisting of a point object and a point reference source, using a two-dimensional, planar geometry, and a Fourier-transform, interference fringe hologram.

The complex-valued amplitude at the hologram plane is $$u_H = \exp(ikr_+) + \exp(ikr_-) \quad (1)$$

ignoring radial dependence of amplitude, where $r_+$ and $r_- \approx$ are distances from the sources to the observation point, which has coordinates $(X_H, Z_H)$. Given that the sources are at $(X_o,$ zero$)$, and using the quadratic approximations, the amplitude at the hologram plane is $$U_H = 2e^{ik\bar{Z}_H} \exp[ik(X_H^2 + X_o^2)/2Z_H] \cos(KX_oX_H/Z_H) \quad (2)$$

The intensity is $|u_H|^2$. Assume the optical, amplitude transmittance $t_H$ of the hologram is proportional to $|u_H|^2$. Because the hologram has finite size, multiply $|u_H|^2$ by a rectangle function with width $2W$.

The beam splitter and the prisms produce two, shifted, holograms which are symmetric about a common axis, as suggested by the ray paths in the drawing. For a two-dimensional case we would have two holograms, one with transmittance $t(X,Y)$, and a second with transmittance $t(-X,-Y)$; the $X$-$Y$ plane is orthogonal to $Z$.

In the present one-dimensional simplified case, now being considered, $$t_H = \cos^2[kX_o(X_H-a)/Z_H]\,\text{rect}[(X-a)/2W] + \cos^2[kX_o(X_H+a)/Z_H]\,\text{rect}[(X+a)/2W], \quad (3)$$

where the holograms are shifted laterally by $\pm a$.

The reconstructed amplitude is coherent for each pair of axially symmetric points. Thus for a pair of points a Fourier transform is obtained with the lens or at a large distance from the hologram, $$u = E\int_{a-w}^{a+w} t_r\,\delta(X_H - \bar{X}_H)\,e^{-ikXX_H/(Z-Z_H)}dX_H$$
$$+ E\int_{a-w}^{a+w} t_L\,\delta(X_H + \bar{X}_H)\,e^{-ikXX_H/(Z-Z_H)}dX_H,$$

where $t_r$ and $t_L$ are the two terms in equation (3), where $E$ is a phase factor, and where the temporally and spatially coherent points are at $\bar{X}_H$ and $-\bar{X}_H$. (Line sources on the holograms through delta functions were assumed.) Doing the integrals and combining two exponential functions into a cosine function, the following is obtained.

$$u = E\cos^2[kX_o(\bar{X}_h - a)/Z_H]\cos[kX\bar{X}_H/(Z-Z_H)] \quad (4)$$

The images are given by spatially non-coherent addition of power, on integrating $|u|^2$ from equation (4), over the hologram, that is from $a-W$ to $a+W$. On carrying out the integrals the following is obtained $$|u_I|^2 = (3/2)W + 2W\text{sinc}2\alpha W + (W/2)\text{sinc}4\alpha W + (3/2)W\cos2\alpha\beta\text{sinc}2\beta W + W\cos2\alpha\beta[\text{sinc}2(\alpha+\beta)W + \text{sinc}2(\alpha-\beta)W] + W\cos2\alpha\beta[\text{sinc}4(\alpha+\beta/2)W + \text{sinc}4(\alpha-\beta/2)W], \quad (5)$$

where sinc $X$ means $X^{-1}\sin X$, $\alpha$ is $kX_o/Z_H$, and $\beta$ is $kX/(Z-Z_H)$.

$\alpha k^{-1}$ is the angle between the point object and the normal to the hologram plane. $\beta k^{-1}$ is the angle between the normal and the maxima of sinc 2 $(\alpha \pm \beta)W$ and sinc 4 $(\alpha \pm \beta/2)W$. For $\beta = \pm \alpha$ brightness maxima are obtained; each maximum occurs at angle equal to that of the object direction. For $\beta = \pm 2\alpha$, we obtain a second pair of maxima. The maxima can be interpreted as images because they occur in pairs at angles which numerically are equal to or multiples of the angles to the object.

From the foregoing description, it will be apparent that there has been provided an improved method of system for holography which permits holograms to be produced and reconstructed in real time and without the need for intermediate processing as by the production of an optical hologram. The method utilizes coherent illumination in the production of the hologram and spatially non-coherent illumination in the reconstruction. This unique combination of coherent and non-coherent illumination affords a real time holographic technique which permits objects, especially in optically opaque surroundings, to be identified. Various uses of such techniques may be found in the analysis and design of microwave and acoustic components, such as radomes and the like. Variations and modifications in the herein described method and system, as well as additional uses and applications thereof, will undoubtedly become apparent to those skilled in the art. Accordingly the foregoing description should be taken as illustrative and not in any limiting sense.

What is claimed is:

1. The method of holography which comprises the steps of
   a. illuminating an object to form a hologram in a hologram plane,
   b. detecting radiation power at a plurality of points in said hologram plane,
   c. converting the detected power at each of said points, each into a separate source of visible light, and
   d. spacially interfering said light from said sources of visible light to transform said light from said sources into an image of the object.

2. The invention as set forth in claim 1 wherein said step of illuminating said object includes the step of projecting coherent illumination toward said object.

3. The invention as set forth in claim 2 wherein said radiation is invisible radiation.

4. The invention as set forth in claim 3 wherein said radiation is microwave radiation.

5. The invention as set forth in claim 3 wherein said radiation is sonic waves.

6. The invention as set forth in claim 2 wherein said illuminating step further comprises the step of projecting reference coherent illumination at said hologram plane.

7. The invention as set forth in claim 2 wherein in said or converting step said detected power is converted into a plurality of separate sources of spatially non-coherent, visible light.

8. The invention as set forth in claim 7 wherein said interfering step comprises the steps of doubling the light from said sources to produce interference therebetween, and synthesizing said image from said interfering light to form said image.

9. The invention as set forth in claim 8 wherein said synthesizing step includes imaging said interfering light at a Fourier transform plane.

10. The invention as set forth in claim 7 wherein said interfering step comprises the steps of splitting the light from said sources into an axially symmetric pair of fringe patterns, and imaging said pair of fringe patterns at a Fourier transform plane to form said image of said object.

11. A holograhpic system which comprises
    a. a plurality of detector means for deriving the intensity of illumination at a plurality of separate points in a hologram plane,
    b. a plurality of means coupled to said detector means for providing a plurality of sources of visible light each of intensity corresponding to the intensity of the detected illumination at different ones of said points in said hologram plane, and
    c. means providing for spacial interference between said light from said sources transforming the light pattern formed by said sources into a visible image of the hologram.

12. The invention as set forth in claim 1 including means for illuminating an object with coherent waves to form the fringe patterns of a hologram of said object in said hologram plane.

13. The invention as set forth in claim 12 wherein said source providing means comprises a plurality of sources of spatially non-coherent light, and means operated by said detected means for energizing said sources to produce light.

14. The invention as set forth in claim 12 wherein said illuminating means includes means for projecting invisible radiation along a path to said object and from said object to said hologram plane.

15. The invention as set forth in claim 14 wherein said radiation is microwave radiation.

16. The invention as set forth in claim 14 wherein said radiation is sonic waves.

17. The invention as set forth in claim 14 wherein said illuminating means also includes a source of reference coherent radiation, and means coupled to said reference source for projecting a reference field at said hologram plane.

18. The invention as set forth in claim 11 wherein said detector means comprises an array of antennas coupled to each of said antennas for providing electrical signals corresponding to the intensity of illumination received at each of said antennas.

19. The invention as set forth in claim 18 wherein said source providing means includes an array of lamps, and means for applying said signals separately to different ones of said lamps for illuminating said lamps.

20. The invention as set forth in claim 19 wherein said lamps are incandescent lamps.

21. The invention as set forth in claim 20 wherein said spacial interfering means includes means for providing two axially symmetric and 180° out of phase patterns of illumination corresponding to the illumination pattern produced by said lamps, and means for imaging said two patterns at a Fourier transform plane.

22. The invention as set forth in claim 21 wherein said imaging means is a converging lens in the light path about which said patterns are symmetric.

* * * * *